(12) United States Patent
Popelar

(10) Patent No.: US 6,803,351 B2
(45) Date of Patent: Oct. 12, 2004

(54) BIODEGRADABLE MACHINE TOOL COOLANT

(76) Inventor: Frank J. Popelar, 11505 Preston Rd., Britton, MI (US) 49229

( * ) Notice: Subject to any disclaimer, the term of this patent is extended or adjusted under 35 U.S.C. 154(b) by 0 days.

(21) Appl. No.: 10/173,459

(22) Filed: Jun. 15, 2002

(65) Prior Publication Data

US 2002/0195582 A1 Dec. 26, 2002

Related U.S. Application Data

(60) Provisional application No. 60/299,679, filed on Jun. 20, 2001.

(51) Int. Cl.$^7$ .................... C10M 101/04; C10M 105/18
(52) U.S. Cl. ...................... 508/491; 508/252; 508/580; 72/42; 252/73; 252/76
(58) Field of Search .................. 516/76; 252/73, 252/76; 508/491, 580, 525; 426/585, 602; 72/42; 44/301, 302

(56) References Cited

U.S. PATENT DOCUMENTS

| | | | | | |
|---|---|---|---|---|---|
| 3,266,922 | A | * | 8/1966 | Cummings et al. | 516/76 X |
| 3,282,843 | A | * | 11/1966 | Alburger | 516/76 X |
| 3,333,975 | A | * | 8/1967 | Penoyer | 516/76 X |
| 3,488,198 | A | * | 1/1970 | Bundus | 426/585 |
| 3,917,859 | A | * | 11/1975 | Terada et al. | 426/585 |
| 4,279,941 | A | * | 7/1981 | Bosco et al. | 426/602 |
| RE31,754 | E | * | 12/1984 | Miller et al. | 426/602 |
| 4,783,274 | A | * | 11/1988 | Jokinen et al. | |
| 5,580,567 | A | * | 12/1996 | Roberts | 516/76 X |
| 5,863,872 | A | * | 1/1999 | Garnier | 508/491 |
| 5,972,855 | A | * | 10/1999 | Honary | 508/491 |
| 6,204,225 | B1 | * | 3/2001 | Lightcap, Jr. | 508/491 X |
| 6,383,992 | B1 | * | 5/2002 | Garnier et al. | 508/491 |
| 6,387,874 | B1 | * | 5/2002 | Schalitz et al. | 510/530 |
| 6,391,837 | B1 | * | 5/2002 | Coleman | 510/238 |

OTHER PUBLICATIONS

Handbook of Industrial Surfactants, compiled by Michael and Irene Ash, Gower Publishing Co., Brookfield, Vermont (opyright 1993—month unavailable), pp. 98 and 313.*

The Merck Index An Encyclopedia of Chemicals, Drugs, and Biologicals, Tenth Edition, (Merck & Co, Inc. Rahway, NJ, 1983) p. 957, entry 6518, Jan. 1984.*

* cited by examiner

*Primary Examiner*—Daniel S. Metzmaier
(74) *Attorney, Agent, or Firm*—James M. Deimen

(57) ABSTRACT

A new additive for water based metal cutting and grinding coolant comprises a combination of soybean oil and surfactant, the surfactant being a nonoxynol or alcohol based detergent that is biodegradable. The proportion of soybean oil to surfactant is adjusted for metal cutting or grinding and the proportion of additive to water is also adjusted for metal cutting or grinding. A small amount of bacteriocide may be added to the additive to avoid rancidity.

19 Claims, No Drawings

BIODEGRADABLE MACHINE TOOL COOLANT

This application claims the benefit of provisional patent application no. 60/299,679 filed Jun. 20, 2001.

BACKGROUND OF THE INVENTION

The field of the invention pertains to machine tools for metal cutting and metal grinding and, in particular, to coolant fluids which pour over and substantially flood the workpiece and cutting tool or grinding wheel for a variety of purposes. The foremost purpose is usually to cool the workpiece and cutting tool or grinding wheel continuously to maintain them always below a temperature that would damage the workpiece, cutting tool or grinding wheel. Other purposes are to provide a lubricating function at the interface between a cutting tool, chip and workpiece and to clean and flood away cutting debris. Cutting and grinding fluids are usually water based because they are extremely effective and inexpensive for heat removal. Unfortunately water is a relatively poor lubricant or cleaning fluid, therefore additives, chiefly soaps, have been added to provide an enhanced cleaning effect and some lubrication.

SUMMARY OF THE INVENTION

A new metal cutting fluid additive to a water coolant comprises a combination of vegetable oil such as soybean oil and a surfactant. The ratio of soybean oil to surfactant is adjusted for the machining operation to be cooled. A higher proportion of soybean oil to surfactant is preferred for metal cutting, a lower proportion of soybean oil to surfactant is preferred for metal grinding. By incorporating a biodegradable surfactant the additive is completely biodegradable thus forming a non-hazardous waste product after filtering out metal chips or grinding debris. A small amount of bacteriocide may be added to retard spoilage (rancidity) of the additive during storage or extensive re-use. The new additive is suitable for a wide variety of metals, metal alloys and other materials but also has the added benefit of protecting against corrosion of freshly machined surfaces on some common metals such as cast iron and low carbon steel.

DESCRIPTION OF THE PREFERRED EMBODIMENTS

The principal ingredients of the additive are soybean oil and surfactant in two primary proportions by volume. For metal grinding operations the ratio of oil to surfactant is 2 to 1. For metal cutting the ratio of oil to surfactant is 5 to 2 or a slightly thicker composition. For specific applications these ratios may be further adjusted. A small amount of a bacteriocide such as sodium benzoate (at 0.1% by volume) may be added to retard the oil from turning rancid.

A variety of nonoxynol and alcohol based detergents such as ethoxylated alcohol detergents may be used for the surfactant. Such detergents also act as emulsifiers and wetting agents. The preferred surfactants by trademark are Makon-6 (nonoxynol or polyoxyethylene alkylphenols) and Cedepal CO-530 (nonoxynol or polyoxyethylene alkylphenols) from Stepan or Stepan Canada and Tomadol 1–3 ($C_{9-11}$ linear primary alcohol ethoxylate) from Tomah Products.

To prepare the coolants about 2% by volume of the 2 to 1 ratio is added to substantially demineralized water for grinding operations and about 3–4% by volume of the 5 to 2 ratio is added to substantially demineralized water for metal cutting operations. Either of the formulations acts as a rust inhibitor on work pieces of cast iron or steel.

Although this invention is primarily based on soybean oil, other vegetable oils such as canola (rape seed) oil may be expected to function in a similar manner.

What is claimed is:

1. A metal cutting and grinding coolant additive consisting of a vegetable oil, a biodegradable surfactant selected from the group consisting of nonoxynol and ethoxylated alcohol; and optionally a bacteriocide, wherein the ratio of vegetable oil to surfactant is about 5 parts to 2 parts by volume.

2. The additive of claim 1 wherein the surfactant is a nonoxynol.

3. The additive of claim 1 wherein the surfactant is an ethoxylated alcohol.

4. The additive of claim 1 further consisting of a bacteriocide.

5. The additive of claim 4 wherein the bacteriocide is sodium benzoate.

6. The additive of claim 5 wherein the sodium benzoate is about 0.1% by volume.

7. A metal cutting coolant consisting of about 3–4% by volume of the additive of claim 1 the balance being water.

8. A metal grinding coolant consisting of about 2% additive by volume, the balance being water, said additive consisting of soybean oil, a biodegradable surfactant selected from the group consisting of nonoxynol and ethoxylated alcohol; and optionally a bacteriocide.

9. The coolant of claim 8 wherein the ratio of soybean oil to surfactant is about 2 parts to 1 part by volume.

10. The coolant of claim 8 wherein the surfactant is nonoxynol.

11. The coolant of claim 8 wherein the surfactant is an ethoxylated alcohol.

12. The coolant of claim 8 further consisting of a bacteriocide.

13. The coolant of claim 12 wherein the bacteriocide is sodium benzoate.

14. A metal cutting and grinding coolant additive consisting of a vegetable oil, a biodegradable surfactant selected from the group consisting of nonoxynol and ethoxylated alcohol; and optionally a bacteriocide, wherein the ratio of vegetable oil to surfactant is about 2 parts to 1 part by volume.

15. The additive of claim 14 wherein the surfactant is a nonoxynol.

16. The additive of claim 14 wherein the surfactant is an ethoxylated alcohol.

17. The additive of claim 14, further consisting of a bacteriocide.

18. The additive of claim 17 wherein the bacteriocide is sodium benzoate.

19. The additive of claim 18, wherein the sodium benzoate is about 0.1% by volume.

* * * * *